US006635854B1

(12) United States Patent
Shelton

(10) Patent No.: US 6,635,854 B1
(45) Date of Patent: Oct. 21, 2003

(54) OVEN WITH WATER EVAPORATOR ON DOOR

(75) Inventor: Winston Shelton, Louisville, KY (US)

(73) Assignee: Carton Drive Enterprises, Louisville, KY (US)

( * ) Notice: Subject to any disclaimer, the term of this patent is extended or adjusted under 35 U.S.C. 154(b) by 30 days.

(21) Appl. No.: 10/079,212

(22) Filed: Feb. 20, 2002

(51) Int. Cl.[7] .......................... F27D 19/00; A21B 1/24; A21B 1/40; A47J 27/16; F24C 15/02

(52) U.S. Cl. ...................... 219/483; 219/486; 219/401; 126/20

(58) Field of Search ................................ 219/483, 486, 219/401; 126/20, 190, 193, 198

(56) References Cited

U.S. PATENT DOCUMENTS

| | | | |
|---|---|---|---|
| 2,526,974 | A | 10/1950 | Schipanski |
| 4,048,473 | A | 9/1977 | Burkhart |
| 4,281,636 | A | 8/1981 | Vegh et al. |
| 4,612,911 | A | 9/1986 | Onodera |
| 4,623,780 | A | 11/1986 | Shelton |
| 4,674,402 | A | 6/1987 | Raufeisen |
| 4,770,888 | A | 9/1988 | Loeb |
| 4,782,214 | A | 11/1988 | Voegtlin |
| 4,939,987 | A | 7/1990 | Smith |
| 4,984,557 | A | 1/1991 | Konig |
| 5,075,120 | A | 12/1991 | Leary et al. |
| 5,083,505 | A | 1/1992 | Kohlstrung et al. |
| 5,301,652 | A | 4/1994 | Willis et al. |
| 5,545,877 | A | 8/1996 | Shelton |
| 5,558,010 | A | 9/1996 | Shelton |
| 5,595,109 | A | 1/1997 | Shelton |
| 5,836,086 | A | 11/1998 | Elder |
| 5,934,178 | A | 8/1999 | Caridis et al. |

FOREIGN PATENT DOCUMENTS

| | | | |
|---|---|---|---|
| DE | 4116425 | * | 1/1992 |
| FR | 2520855 | * | 8/1983 |
| JP | 363214655 A | | 1/1988 |
| JP | 363294856 A | | 12/1988 |
| JP | 07087932 A | | 4/1995 |

* cited by examiner

*Primary Examiner*—Joseph Pelham
(74) *Attorney, Agent, or Firm*—Camoriano and Associates; Theresa Fritz Camoriano; Guillermo Camoriano

(57) ABSTRACT

An oven includes a food chamber with an access door which houses a water evaporator chamber in fluid communication with the food chamber. By sensing the temperature of the water in the evaporator and the dry bulb temperature within the food chamber and by controlling a dry heat source that heats the air and a wet heat source that heats the water, the cook can control both the final food temperature and the degree of browning of the food.

10 Claims, 3 Drawing Sheets

OVEN WITH WATER EVAPORATOR ON DOOR

BACKGROUND OF THE INVENTION

The present invention relates to an apparatus for thermalizing or cooking food in an oven, using an evaporator to maintain the desired difference between the wet bulb and dry bulb temperatures in the food chamber.

Traditional ovens characteristically utilize a dry heat system. The limitations of this equipment have led users to develop alternate cooking techniques, such as papillote cooking (bag cooking) in an effort to have some control over the parameters which actually affect the quality of the end product. Winston Industries has manufactured ovens or thermalizers having evaporators, in which the temperature of water in the evaporator was controlled, and these ovens have provided a much improved ability to control the quality of the food.

SUMMARY OF THE INVENTION

The present invention provides an oven in which the evaporator is conveniently located on the access door to the oven. This facilitates the task of adding water to the evaporator, checking the water level in the evaporator, and draining the water from the evaporator.

An embodiment of the present invention also adds a control feature which allows the water in the evaporator to be brought up to boiling temperature to prevent bacteria build-up.

An embodiment of the present invention also adds a sparger, which injects air into the evaporator in order to enhance the transfer of moisture from the evaporator to the food chamber.

In a preferred embodiment, the cook has three settings he can control. First, he sets the wet bulb temperature inside the food chamber, which establishes the ultimate food temperature. The controller controls this temperature by controlling a heater inside an evaporator. Second, the cook sets the degree of browning of the food, which really is setting a differential between the wet bulb temperature and the dry bulb temperature in the food chamber. The control system controls the difference between the dry-bulb-temperature and the wet-bulb-temperature in the food chamber (thereby controlling the degree of browning) by controlling a heater that heats the air in the food chamber. Temperature sensors in both the evaporator and in the food chamber provide feedback to the controller. Third, the cook may set a timer.

The food itself, inside the food chamber, acts like a wet bulb sensor, since is it has a moist outer surface and is sensing the conditions inside the oven. The temperature in the evaporator establishes the wet bulb temperature in the food chamber, which, in turn, establishes the final food temperature. This means that the temperature sensor in the evaporator senses a temperature that is very close to the final temperature of the food. By being able to control the difference between the wet bulb temperature and the dry bulb temperature inside the food chamber (thereby controlling the driving force that causes evaporation of moisture from the food), the cook can control the browning of the food.

Thus, this oven gives the cook a superior ability to control the quality of food and to reproduce that quality on a regular basis.

DESCRIPTION OF THE PREFERRED EMBODIMENT

Figure 2:
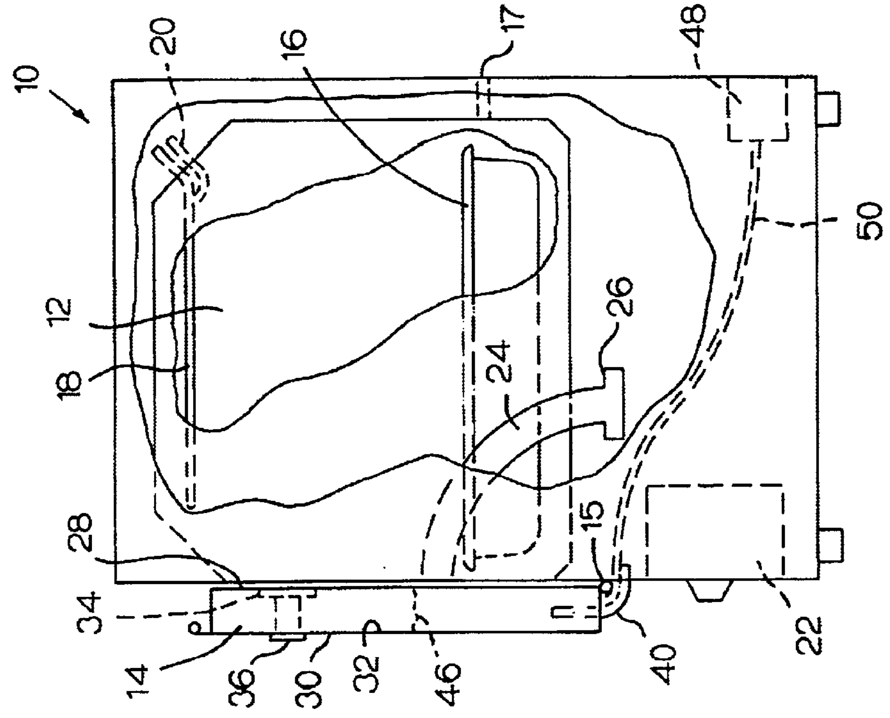
FIG. 2 is a broken away side view of the oven of FIG. 1.

FIGS. 1 through 5 show an example of an oven 10 made in accordance with the present invention. The oven 10 includes a substantially closed food chamber 12, having an access door 14. Note that, in this embodiment 10, the door 14 has a horizontal axis hinge 15, so that it swings down to open and up to close. However, the door 14 could also be hinged vertically or mounted in other known ways without departing from the scope of the invention as claimed. However, in that case, the fill and drain ports probably would be moved to a different location. There is a vent 17 from outside the oven 10 into the food chamber 12, which permits ambient air to enter the food chamber 12, be heated, and leave the food chamber 12.

Figure 3:
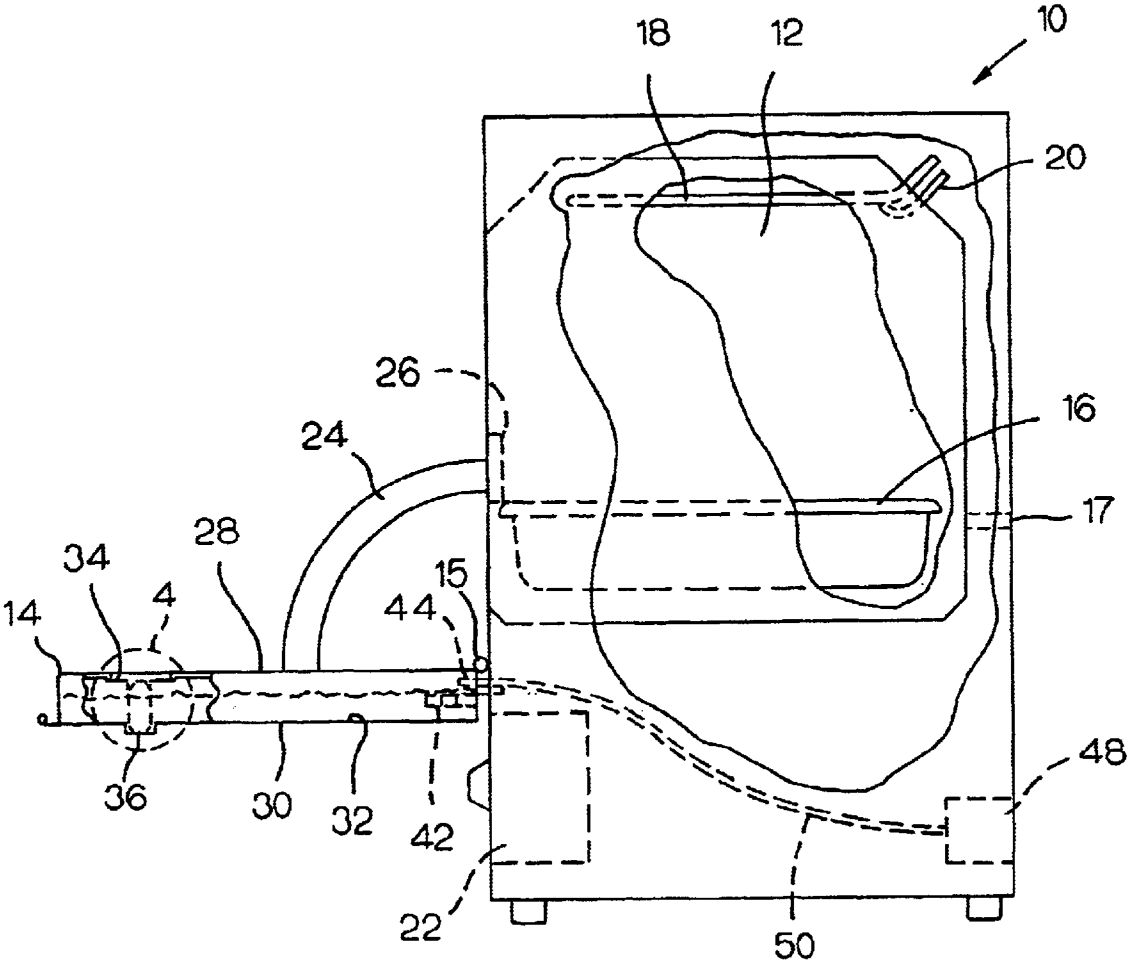
FIG. 3 is similar to the view shown in FIG. 2, except that the door is open and partially broken away to show the fill and drain ports to the door's evaporator.

Referring now to FIGS. 2 and 3, inside the food chamber 12 there are racks 16 to hold the food. There are also a dry heat source 18 and a dry bulb temperature sensor 20. A controller 22 adjusts the heat input to the food chamber 12 by controlling the heat source 18, and the temperature sensor 20 provides feedback to the controller 22, as will be described in more detail later.

The door 14 includes an arm 24 with a limit stop 26, which limits how far the door 14 opens. In this embodiment 10, the door 14 opens until it is substantially parallel to the horizontal floor or countertop on which the oven 10 sits, at which point the limit stop 26 precludes any further opening of the door 14.

Figure 4:
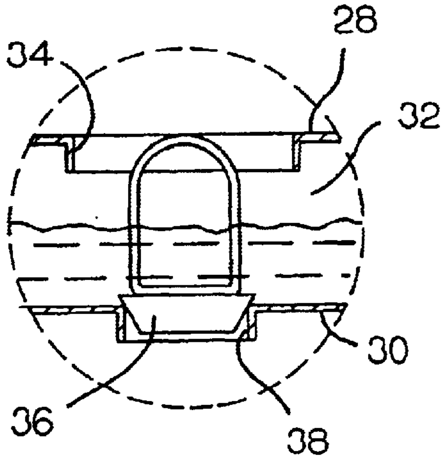
FIG. 4 is a detailed, enlarged view of the fill and drain ports of FIG. 3; and, FIG. 5 is schematic diagram of the controller for the oven of FIG. 1.
Figure 5:
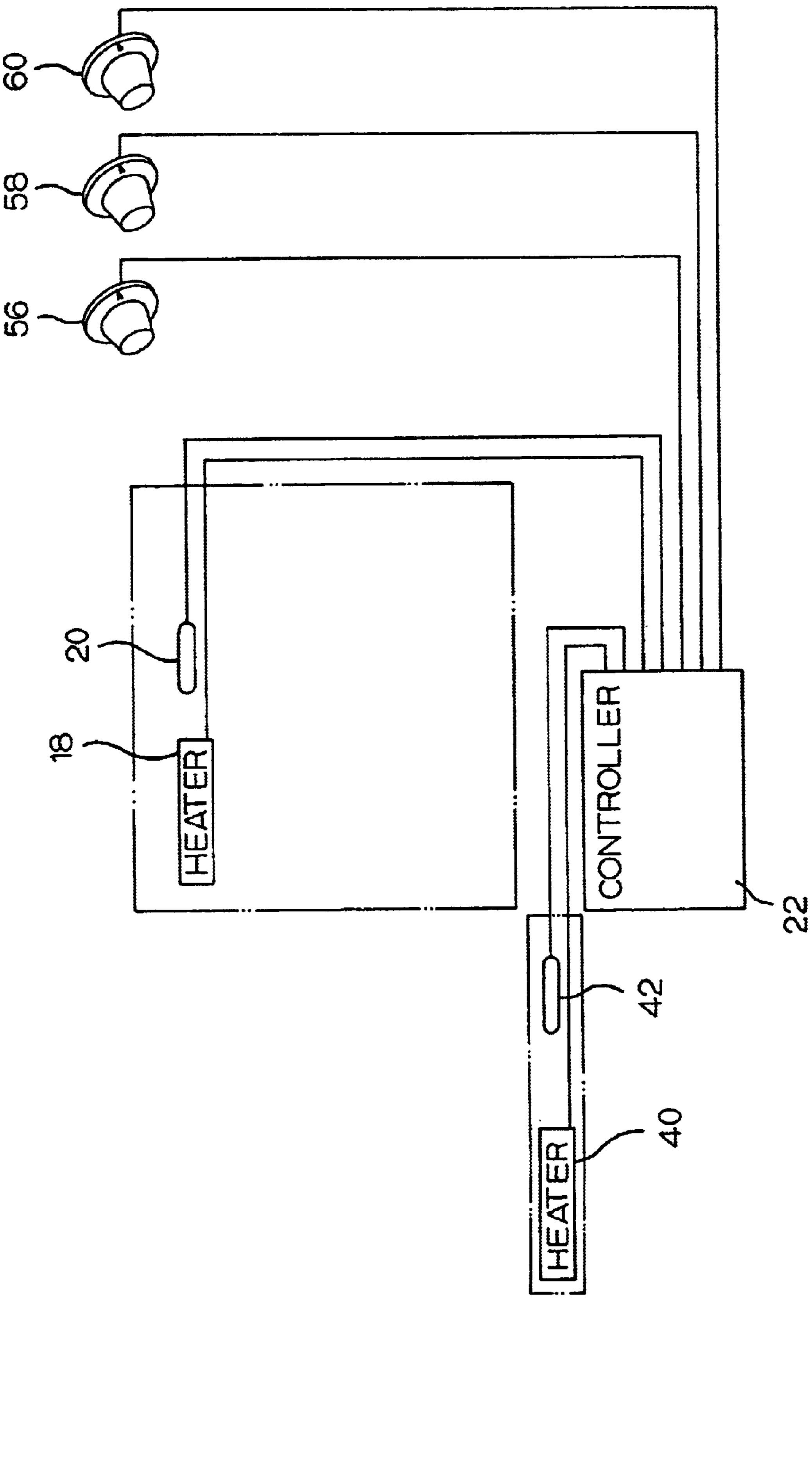

As best seen in FIGS. 2 and 3, the door 14 includes an inside wall 28 and an outside wall 30 which are connected together to define a hollow cavity 32, which serves as a water evaporator. As best illustrated in FIG. 4, there is an opening 34 on the inside wall 28, which serves as a fill port. There is also an opening 38 in the outside wall 30, which serves as a drain port. When the door 14 is open (as shown in FIG. 3), the inside wall 28 of the door 14 is facing up, and water can be poured into the evaporator 32 through the port 34. This fill port opening 34 also serves as the outlet for vapor generated in the evaporator 32, as is explained later. In this embodiment 10, the fill port 34 also provides access to remove or install a drain plug 36, which covers the drain port 38 in the outside wall 30 of the door 14. When the drain plug 36 is removed (and the door is in the open position as shown in FIG. 3), the liquid in the evaporator 32 is able to drain out of the evaporator 32 through the drain port 38. Note that parts or all of the inside and outside walls 28, 30 may be made from a transparent material, such as tempered glass, to allow the user to readily determine the water level in the evaporator 32, as well as to visually inspect the food in the food chamber 12, without having to open the door 14.

Figure 1:
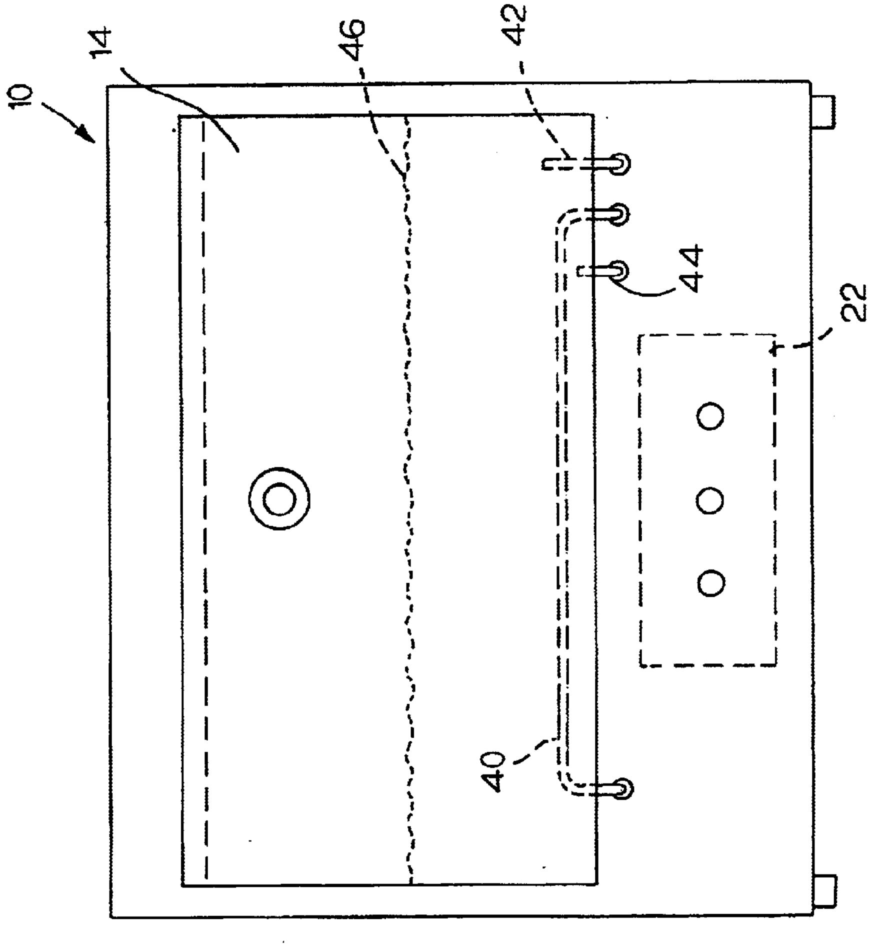
FIG. 1 is a schematic front view of an oven made in accordance with the present invention.

Inside the evaporator 32 are located another heat source 40 (which is referred to as a wet heat source, since it is in the water evaporator), a temperature sensor 42, and a sparger 44 to inject air into the evaporator 32. It should be noted that the heat source 40 in the evaporator 32 as well as the heat source 18 in the food chamber 12 are preferably electric (resistance) heat sources, but other known heat sources could also be used. Also, the wet heat source 40, the temperature sensor 42, and the sparger 44 are all located such that, when the access door 14 is closed (as shown in FIG. 1), they are all submerged below the water level 46, and they all remain submerged until most of the water in the evaporator 32 has evaporated.

The sparger 44 includes a compressor or fan 48 which draws air, preferably from outside of the food chamber 12, and conveys it via tubing 50 to the injection point in the evaporator 32. The injection point may be a single injection point as illustrated in FIG. 1, or it may be an injection manifold with a plurality of openings to distribute the injected air bubbles in a more uniform manner. It should be noted that the sparger 44 may draw the air from inside the food chamber 12, if desired, instead of or in addition to drawing outside air. The sparger 44 serves to enhance the mass and heat transfer from the water evaporator 32 in the access door 14, to the food chamber 12. This allows for a faster and more efficient transfer of the moisture laden environment in the water evaporator 32 to the food chamber 12. It should also be noted that the food chamber 12 is vented to atmosphere by means of the vent 17.

The controller 22 includes three inputs 56, 58, 60, which the cook can set. The first input 58 is used to set the desired water temperature in the evaporator, which sets the wet bulb temperature in the food chamber, thus setting the end temperature of the food. The second input 60 is used to control the degree of browning by setting the differential between the wet bulb and dry bulb temperature. The third input 56 is used to set the cook time.

The controller 22 receives temperature readings from the temperature sensor 42 in the evaporator 32 and from the temperature sensor 20 in the food chamber 12. The controller compares the evaporator temperature with the set point that was input by the cook and adjusts the evaporator heat source 40 accordingly to maintain the set point temperature. As is discussed in more detail later, the evaporator set point temperature corresponds to the long term equilibrium temperature of the food item in the food chamber 12. The degree-of-browning input 60 allows the cook to select a value (such as within a range of 0–10) representing degrees of browning (0 meaning no browning; 10, high browning). This input 60 corresponds to increasing differences between the water evaporator temperature (the wet bulb temperature as sensed by the sensor 42) and the dry bulb temperature in the food chamber (as sensed by the sensor 20). The following table provides an example of how the browning scale may

| Set Browning Value | Difference in ° F. between sensor 42 and sensor 20 |
|---|---|
| 0 | 0 |
| 1 | 5 |
| 2 | 10 |
| 3 | 20 |
| 4 | 30 |
| 5 | 40 |
| 6 | 50 |
| 7 | 75 |
| 8 | 100 |
| 9 | 125 |
| 10 | 150 |

Operation of the Oven

The cook fills the evaporator to the desired level by pouring water through the fill port 34. The cook then inserts the food into the food chamber 12 of the oven 10, sets the water evaporator temperature by means of the input 58, thus setting the food temperature, and sets the degree of browning by inputting the desired value on the browning input 60. As shown in the table above, when the cook selects a value to set the degree of browning, he is actually setting the differential between the wet bulb and dry bulb temperatures, which controls the degree of browning. These inputs may be by buttons, dials, or other known input means. The cook may then set the cook time using the input 56 or may simply use that input to turn the oven on. The controller 22 then controls the power to the wet heat source 40 and to the dry heat source 18, to control the evaporator temperature measured by the sensor 42 and to control the dry bulb temperature relative to the evaporator temperature as measured by the sensor 20 based on the inputs.

The food generally will be colder than the evaporator set point temperature (as set by input dial 58) when the food is put into the food chamber. The vapor in the food chamber 12 will condense on the food surface, transferring its latent heat of vaporization to the food to warm up the food, and it will continue to do so until the food reaches the water evaporator set point temperature sensed by the sensor 42. Since the food generally has a large mass and does not heat as quickly as the water in the evaporator, it will approach the evaporator set point temperature of the sensor 42 as the cooking time progresses.

The oven 10 includes the evaporator 32 with a heat source 40 to regulate the water temperature. The central controller 22 applies power to the wet heat source 40 as needed to maintain the pre-set evaporator set point temperature at the temperature sensor 42. The central controller 22 also applies power to the dry heat source 18 as needed to maintain the pre-set temperature differential between the evaporator set point temperature at the sensor 42 and the dry bulb temperature at the dry bulb sensor 20 to reach the set degree of browning.

Once the water temperature has been set, for example at 135 degrees F., the water in the evaporator is heated to that temperature. The wet heat source 40 continues to evaporate water from the evaporator 32 until a partial pressure equilibrium is reached in the food chamber 12 corresponding to the partial pressure of water at that temperature (135 degrees F.). If the food temperature is below 135 degrees F., the food acts as a condenser, condensing some of the vapor in the food chamber 12, which warms up the food (as the vapor gives up its latent heat of vaporization to the food) and which lowers the partial pressure of the vapor in the food chamber 12. The lower partial pressure of vapor in the food chamber 12 causes more water to evaporate from the evaporator 32, cooling down the remaining water in the evaporator 32 (via evaporative cooling) and thus causing the controller 22 to turn on the wet heat source 40, causing more water to evaporate from the evaporator 32 in order to maintain the equilibrium pressure corresponding to the evaporator set point temperature of 135 degrees F. This process continues until the food has reached equilibrium at the set point temperature, which, in this example, is 135 degrees F.

At the same time, the central controller 22 will cause the dry heat source 18 to cycle on and off to maintain the pre-set difference in temperature between the dry bulb temperature and the evaporator set point temperature. This process continues until the food has reached equilibrium at the set point temperature of 135 degrees F.

The greater the difference between the dry bulb temperature and evaporator set point temperature, the greater the driving force causing evaporation from the surface of the food located in the food chamber 12. This results in a higher degree of browning of the food item. As the moisture leaves the surface of the food item in the food chamber, chemical components are concentrated on the surface, and this, together with the high temperatures, causes the browning of the food item.

To improve the response characteristics of the food chamber 12, a small amount of air is drawn by the compressor 48, conveyed via the tubing 50 and injected into the evaporator 32 via the sparger 44. This air bubbles through the water in the evaporator 32, where it is warmed and becomes moisture laden to the degree corresponding to the partial pressure of water at the existing temperature. This moisture laden air is displaced by the continual supply of fresh air injected via the sparger 44, which pushes the moisture laden air out through the opening 34 of the fill port and into the food chamber 12. With the food chamber 12 vented properly by means of the vent 17, the wet heat source 40 is cycled on and off as needed to control the temperature sensed by the evaporator sensor 42, thus controlling the equilibrium food temperature. The dry heat source 18 is cycled on and off as needed to control the temperature difference between the dry bulb temperature sensed by the sensor 20 (which is simply the air temperature in the food chamber 12) and the evaporator set point temperature sensed by the sensor 42.

Thus, a cook sets a desired food temperature by setting the desired evaporator set point temperature on the input 58. The cook also sets the desired degree of browning on the browning control input 60. The central controller 22 takes the browning setting and controls the dry heat source 18 to maintain a difference between the dry-bulb temperature at the dry bulb sensor 20 and the evaporator set point temperature at the sensor 42 corresponding to the degree of browning selected by the cook, in accordance with the aforementioned table. The result is a properly thermalized food item to the desired level of doneness (food temperature) and to the desired texture (degree of browning) on a consistent basis and without frequent inspections by the cook.

The controller 22 also includes a provision for heating the water in the evaporator 32 to a boiling temperature (as measured by the sensor 42) to prevent bacteria build-up. This provision may be manually activated by the user, or it may be programmed to activate itself periodically without further user interface. Safety features well known in the industry, such as a low water level cut off switch, may be incorporated in the event that operation with little or no water level is deemed undesirable.

It will be obvious to those skilled in the art that modifications may be made to the embodiment described above without departing from the scope of the invention as claimed.

What is claimed is:

1. An oven for cooking food, comprising:

a housing defining a food chamber;

an access door to said food chamber, said access door defining an evaporator and defining an opening which puts said evaporator in fluid communication with said food chamber when the access door is closed;

a first heat source, located in said evaporator;

a first temperature sensor, which senses the temperature in said water evaporator;

a second heat source, located in said food chamber;

a second temperature sensor, which senses the temperature in said food chamber;

first and second user inputs for setting the desired food temperature and the desired degree of browning; and a controller, which receives signals from said first and second temperature sensors and from said first and second user inputs, and which controls said first and second heat sources to reach the desired food temperature and the desired degree of browning.

2. An oven as recited in claim 1, and further comprising:

an air sparger which injects air into said evaporator.

3. An oven as recited in claim 1, wherein said opening also serves as a water fill port.

4. An oven as recited in claim 3, wherein said access door has an inner wall and an outer wall, wherein said inner wall defines said water fill port opening, and said outer wall defines a water drain port.

5. An oven as recited in claim 4, wherein said water drain port is accessible through said water fill port.

6. An oven as recited in claim 1, wherein said controller also provides for periodically raising the temperature in said evaporator to the boiling point of water.

7. An oven as recited in claim 1, wherein said access door is mounted to said housing so as to pivot relative to said housing about a horizontal axis.

8. An oven, comprising:

a housing defining a food chamber;

a door pivotably mounted to said housing and providing access to said food chamber, said door having an outer wall and an inner wall and defining a evaporator, wherein said inner wall defines a fill port and said outer wall defines a drain port for said evaporator;

a first heat source, located in said evaporator;

a first temperature sensor, which senses the temperature in said evaporator;

a second heat source, located in said food chamber;

a second temperature sensor, which senses the temperature in said food chamber;

first and second user inputs for setting the desired food temperature and the desired degree of browning;

a controller, which receives signals from said first and second temperature sensors and from said first and second user inputs, and which controls said first and second heat sources to reach the desired food temperature and the desired degree of browning; and an air sparger which injects air into said evaporator.

9. An oven as recited in claim 8, wherein said drain port is substantially opposite said fill port, thereby making said drain port readily accessible from said fill port.

10. A method for cooking food, comprising the steps of:

inserting food into an oven chamber which has an access door;

inserting water into a evaporator defined in said access door, wherein said evaporator is in fluid communication with said oven chamber when said access door is closed;

closing the access door; and controlling a first heater in the evaporator and a second heater in the food chamber to control the food temperature and the degree of browning of the food.

* * * * *

UNITED STATES PATENT AND TRADEMARK OFFICE

CERTIFICATE OF CORRECTION

PATENT NO. : 6,635,854 B1 
DATED : October 21, 2003
INVENTOR(S) : Winston Shelton It is certified that error appears in the above-identified patent and that said Letters Patent is hereby corrected as shown below:

<u>Column 1,</u>
Line 49, following the word “since”, delete “is”.

<u>Column 3,</u>
Line 48, following the word “may”, insert -- work --.

Signed and Sealed this

Second Day of December, 2003

JAMES E. ROGAN
*Director of the United States Patent and Trademark Office*